Figure 1:
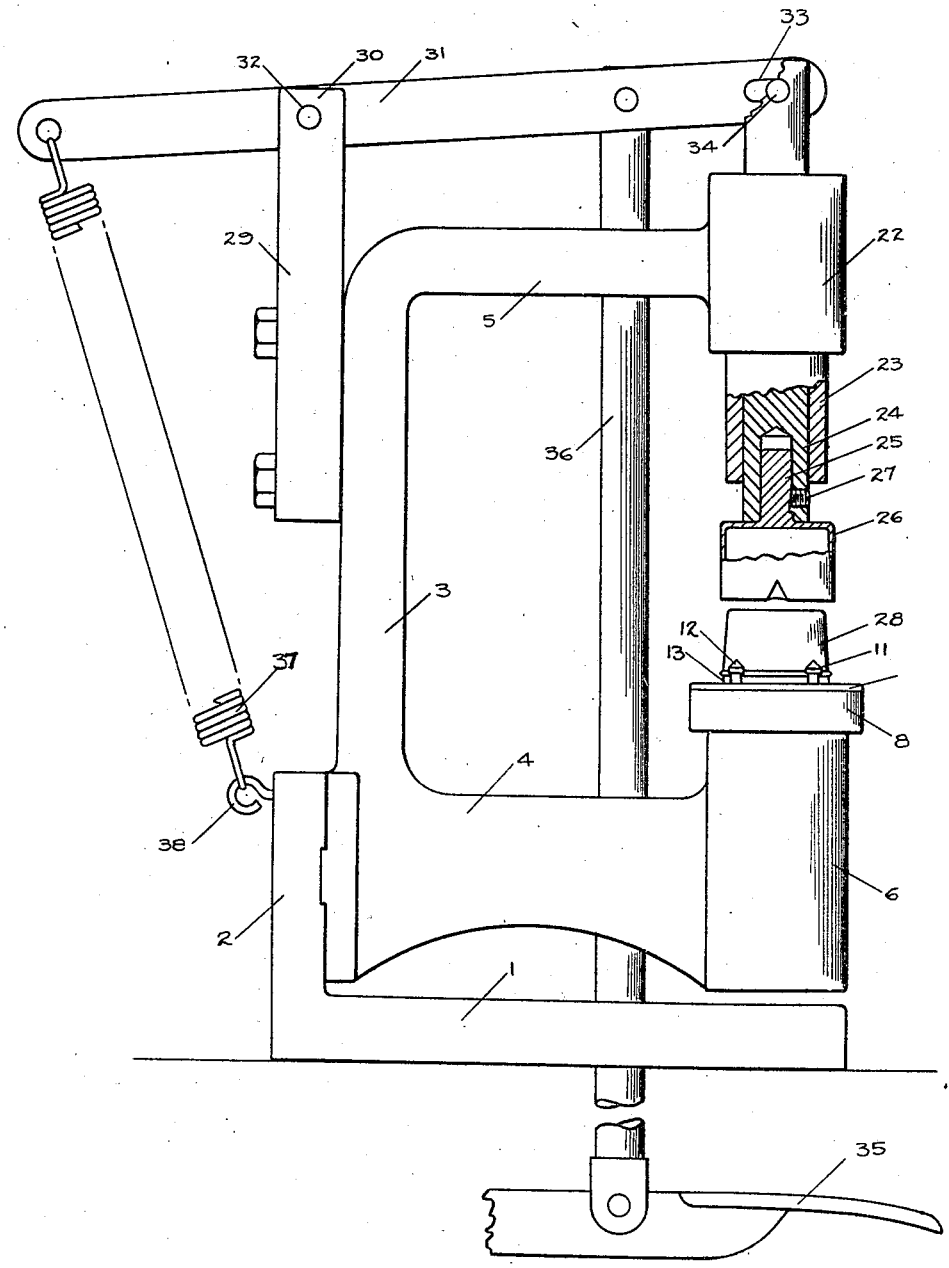

Nov. 6, 1923.    1,473,367
R. M. WASON
LENS MOUNTING MACHINE
Filed April 18, 1922    2 Sheets-Sheet 1

INVENTOR
ROBERT M. WASON
BY
ATTORNEYS

Nov. 6, 1923.  1,473,367
R. M. WASON
LENS MOUNTING MACHINE
Filed April 18, 1922   2 Sheets-Sheet 2
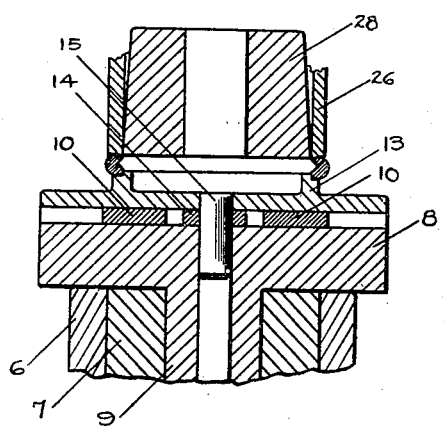
FIG. II
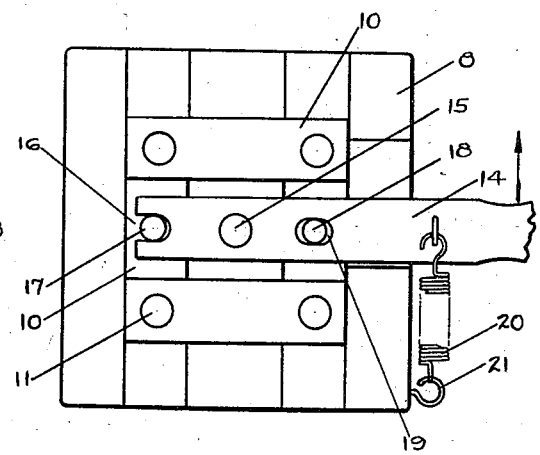
FIG. III
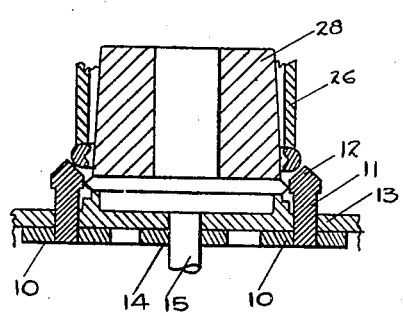
FIG. IV
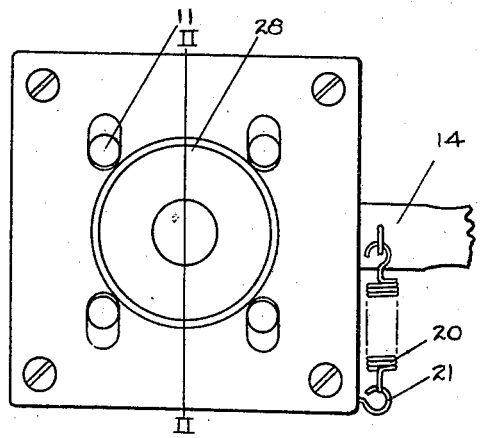
FIG. V
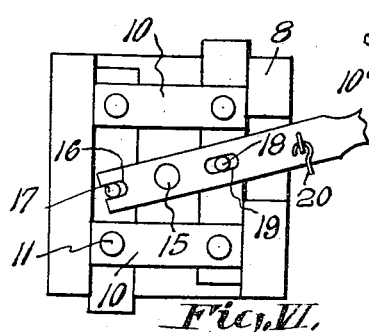
Fig. VI.
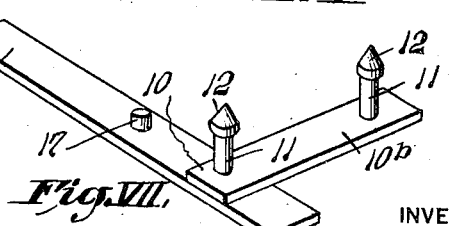
Fig. VII.
INVENTOR
ROBERT M. WASON
BY
H. H. Styll & H. K. Parsons
ATTORNEYS Patented Nov. 6, 1923.

1,473,367

UNITED STATES PATENT OFFICE.

ROBERT M. WASON, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS-MOUNTING MACHINE.

Application filed April 18, 1922. Serial No. 555,047.

*To all whom it may concern:*

Be it known that I, ROBERT M. WASON, a citizen of the United States, residing at Southbridge, in the county of Worcester and State of Massachusetts, have invented certain new and useful Improvements in Lens-Mounting Machines, of which the following is a specification.

This invention relates to new and useful improvements in lens mounting machines and more particularly to a machine for mounting lenses within the eye wires of spectacles and especially spectacles provided with zylonite frames or frames constructed of a similar material.

The main object of the present invention is the provision of a machine whereby lenses may be quickly and readily mounted within the eye wires of spectacles and particularly where the eye wires or frames are formed of zylonite or similar material requiring them to be in a slightly heated condition before being engaged with the lenses.

A further object of the invention is the provision of a lens mounting machine whereby the lens is securely retained in position prior to the mounting of the same within the eye wire, the retaining means being movable whereby to permit the eye wire to be readily moved downwardly for engagement over the edge of the lens.

A still further object of the invention is the provision of a lens mounting machine including means for retaining the lens in position and providing a heated cone adapted to be rested upon the lens and upon which the frame is mounted and further including a movable mandrel adapted to move downwardly over the cone forcing the heated eye wire downwardly until the same moves from the larger end of the cone onto the edge of the lens.

With the above and other objects in view the invention consists in the novel features of construction, the combination and arrangement of parts hereinafter more fully set forth, pointed out in the claims and shown in the accompanying drawings, in which—

Figure I is a side elevation of a lens mounting machine constructed in accordance with my invention.

Figure II is a section II—II of Figure IV.

Figure III is a detail plan.

Figure IV is a diagonal vertical section, and

Figure V is a top plan view of the lens support.

Figure VI, is a view similar to Figure III, with the parts shown in adjusted position.

Figure VII is a detail perspective view of one of the L-shaped members.

In carrying out my invention I provide a base member 1 having an upright portion 2 and mounted upon this upright portion is a U shaped bracket comprising an intermediate upright 3 with a lower horizontal arm 4 and an upper horizontal arm 5. Formed upon the outer end of the arm 4 is a sleeve 6 and mounted within the sleeve 6 is a bearing ring 7. Supported above the ring 7 is a block 8 having a downwardly extending sleeve 9 which is fitted into the ring 7 while the block 8 rests upon the upper end of the sleeve 6.

The block 8 has slidably mounted thereon the opposed L shaped arms 10, the longitudinal portions of said arms being provided with spaced pins 11 preferably cone shaped at their upper ends terminating into hardened polished points 12. These pins 11 are arranged in substantially rectangular position and arranged circumferentially of the lens supporting flange 13 and are moved toward and away from the flange 13 by means of hand lever 14 pivoted at 15 and having at its outer end a recess 16. The engaging pin 17 carried by the cross arm 10$^A$ of one of the L members 10 and a second pin 18 carried by the cross arm of the opposite L are movable within the recess 16 and the slot 19 respectively formed in the lever 14 whereby upon movement of the lever 14 in the direction of the arrow the L arms will be moved away from each other as best shown in Figure VI moving the pins 11 away from the supporting flange 13. As soon as the lever is released the coil spring 20 which has one of its ends attached to the lever and its other end to an eye 21 upon the block 8 will return the lever to its normal position bringing the pins 11 into contact with the edge of the lens which has been placed upon the supporting flange 13 to thus retain the lens in its proper position until the eye wire or frame has been placed thereon.

The upper arm 5 is provided at its outer end with a sleeve 22 and carried by the sleeve is an inner bearing sleeve 23. Movable thru the bearing sleeve 23 is a plunger 24 having a central opening at its lower end to receive the shank 25 which carries the mandrel 26. The finger 25 is retained within the opening in the plunger 24 by means of a set screw 27 which extends thru a portion of the plunger 24 and engages the finger 25.

After the lens is arranged in position upon the upstanding flange 13 the cone member 28 is arranged upon the lens, it being understood that this cone member is in a slightly heated condition, the eye wire or lens frame is then mounted upon the cone and due to the heated condition of the cone the eye wire or frame will also be heated and in order to engage the eye wire or frame with the edge of the lens the mandrel 26 is moved downwardly over the cone 28 forcing the eye wire downwardly over the cone which due to the tapered wall of the cone will stretch the eye wire or frame sufficient to permit the same to readily engage over the edge of the lens, while in its heated condition. The mandrel and cone are then removed and the eye wire and lens then removed from the machine, it being understood that as soon as the eye wire cools the material will contract and tightly bind itself onto the edge of the lenses.

It will be apparent from the above that as the mandrel 26 moves downwardly over the cone 28 the pins 11 will be forced away from the edge of the lens so that the eye wire or frame can be readily moved into its correct position.

Attention is called to the fact that various size cones are to be used in accordance with the size of lenses which are to be mounted in the frame, as it is preferred to have the base of the cone of substantially the same diameter as the lens so that the eye wire or frame when moved downwardly over the heated cone will be stretched enough to permit the same to readily engage over the lens.

Extending upwardly from the intermediate portion 3 of the frame is a bracket 29 having spaced ears 30 at the upper end between which the operating lever 31 is mounted and supported upon a pivot pin 32. One end of the lever 31 is provided with a slot 33 having extended there thru a pin 34 carried by the upper end of the plunger 24 whereby upon reciprocating movement of the lever 31 will impart movement to the plunger 24. The lever 31 is actuated by means of a foot treddle 35 connected to the arm 31 adjacent the slot 33 by means of the connecting member 36. The outer end of the lever 31 has connected thereon a coil spring 37, from the lower end of said coil spring a hook 38 carried by the upright tube of the base whereby when the foot treddle 35 is actuated to reciprocate the plunger 24, the coil spring 37 will be pressed under tension so that upon release of the foot treddle the tension of the spring 37 will pull downwardly upon the outer end of the lever 31 moving the plunger 24 upwardly which in turn will remove the mandrel 26 from the cone 28 so that the cone can be readily removed from the lens and the lens and frame removed from the machine.

By reference to Figure IV it will be seen that as the frame is forced down over the expanding block in the direction of the lens it will engage the pointed or cam-like upper ends of the lens positioning pins, forcing them back out of engagement with the lens as the frame moves into lens engaging position. The pins will then laterally engage the frame and steady it in place till the lens is removed from the machine, preventing accidental knocking off of the lens as the expanding block is removed.

It will further be noted by a comparison of Figures II and IV that the lens supporting annulus 13 is formed at its basal portion with a shoulder at such distance below the lens supporting surface that it limits the downward movement of the frame to a position embracing the edge of the lens and prevents the frame from being forced beyond the lens.

What I claim is—

1. A lens mounting machine including a lens support, a frame expanding block and means for forcing a frame over the expanding block in the direction of the lens support said support having an abutment portion limiting the movement of a frame beyond the lens supporting surface of the support.

2. A lens mounting machine including a lens support, movable means having contact with the lens to retain the same in its proper position upon the support, a frame expanding block mounted upon the lens and means for forcing a frame over the expanding block in the direction of the lens support.

3. A lens mounting machine including a lens support, movable lens positioning members adjacent the support, said members having lateral lens engaging portions and projecting cam portions adapted to be engaged by a frame as it is moved toward the lens support, a frame expanding block adapted to be mounted on a lens on the support, and means for forcing a frame over the block into engagement with a lens on the support, whereby the frame will engage the cam portions of the lens positioning members and laterally move said members as the frame moves into engagement with the lens.

4. A lens mounting machine including a lens support having lens positioning members and a frame limiting member, of a frame expanding block adapted to be positioned in axial alinement with the support, a mandrel movable over the expanding block for forcing a frame in the direction of the lens support and means for imparting movement to the mandrel.

5. A lens mounting machine including a support having a lens supporting annulus and a frame engaging shoulder at the base of the annulus, an expanding block adapted to be mounted on a lens, and a plunger member mounted in alinement with the support and adapted to force a frame over the block and around the edge of a lens when on the support, the shoulder preventing forcing of the frame beyond proper position on the edge of the lens.

6. A lens mounting machine including a lens support, movable guide pins arranged adjacent the support and adapted to normally contact with the lens, a frame expanding block mounted upon the lens between the pins, means for forcing the frame over the expanding block in the direction of the lens support.

ROBERT M. WASON.